USO11607059B2

(12) United States Patent
Fritsch et al.

(10) Patent No.: US 11,607,059 B2
(45) Date of Patent: Mar. 21, 2023

(54) SHELF BRACKET ASSEMBLY

(71) Applicant: Bizerba SE & Co. KG, Balingen (DE)

(72) Inventors: Andreas Fritsch, Balingen (DE); Frank Metzger, Albstadt (DE); Harald Witte, Balingen (DE); Luca Kallmann, Wellendingen (DE)

(73) Assignee: BIZERBA SE & CO. KG, Balingen (DE)

( * ) Notice: Subject to any disclaimer, the term of this patent is extended or adjusted under 35 U.S.C. 154(b) by 204 days.

(21) Appl. No.: 17/123,131

(22) Filed: Dec. 16, 2020

(65) Prior Publication Data

US 2021/0196059 A1 Jul. 1, 2021

(30) Foreign Application Priority Data

Dec. 30, 2019 (EP) .................................... 19220148

(51) Int. Cl.
*A47F 10/02* (2006.01)
*A47F 5/00* (2006.01)
(Continued)

(52) U.S. Cl.
CPC ............ *A47F 10/02* (2013.01); *A47F 5/0018* (2013.01); *A47F 5/0043* (2013.01);
(Continued)

(58) Field of Classification Search
CPC ...... G01G 19/414; G01G 21/18; G01G 21/23; G01G 19/52; A47F 10/02; A47F 5/0018;
(Continued)

(56) References Cited

U.S. PATENT DOCUMENTS 4,396,079 A 8/1983 Brendel
4,655,305 A 4/1987 Jacobson
(Continued)

FOREIGN PATENT DOCUMENTS

CN 110169685 A 8/2019
DE 3733961 A1 4/1989
(Continued)

OTHER PUBLICATIONS

Load Cells; Editorial by Industrial Quick Search; accessed on Nov. 8, 2022; pp. 1-27; Grand Rapids, MI.

*Primary Examiner* — Randy W Gibson
(74) *Attorney, Agent, or Firm* — Leydig, Voit & Mayer, Ltd.

(57) ABSTRACT

A shelf bracket assembly mounted upright on a vertically disposed shelf has: a load cell; an anchor; and a cantilever supporting a shelf panel. The cantilever projects from the shelf upright in a substantially horizontal direction. The cantilever has a vertically disposed frame or a vertically disposed metal plate and a mount for the load cell. The load cell has a monolithic measuring body that has: a force-supporting section; a force-introduction section; and a linkage section between the force-supporting section and the force-introduction section. The force-supporting section of the monolithic measuring body is laterally attached to the mount. The monolithic measuring body has at least one mounting hole through which the monolithic measuring body is attached to the mount with a screw extending horizontally through the monolithic measuring body.

19 Claims, 9 Drawing Sheets

(51) Int. Cl.
  *G01G 19/414* (2006.01)
  *G01G 21/23* (2006.01)
  *G01G 19/52* (2006.01)
  *G01M 1/12* (2006.01)

(52) U.S. Cl.
  CPC ........... *G01G 19/414* (2013.01); *G01G 19/52* (2013.01); *G01M 1/122* (2013.01); *A47F 2010/025* (2013.01); *G01G 21/23* (2013.01)

(58) Field of Classification Search
  CPC .. A47F 5/0043; A47F 2010/025; G01M 1/122
  See application file for complete search history.

(56) References Cited

U.S. PATENT DOCUMENTS

| | | | |
|---|---|---|---|
| 5,293,007 A | 3/1994 | Darst et al. | |
| 5,440,077 A | 8/1995 | Konishi et al. | |
| 5,510,581 A | 4/1996 | Angel | |
| 5,623,128 A | 4/1997 | Grimm et al. | |
| 5,723,826 A * | 3/1998 | Kitagawa | G01G 3/147 177/229 |
| 6,215,078 B1 | 4/2001 | Torres et al. | |
| 6,318,184 B1 | 11/2001 | Kimerer, Jr. | |
| 6,817,255 B2 | 11/2004 | Aque et al. | |
| 7,690,270 B1 | 4/2010 | Park | |
| 8,153,913 B2 | 4/2012 | Haefeli et al. | |
| 8,186,232 B2 | 5/2012 | Mcdearmon et al. | |
| 10,121,121 B1 | 11/2018 | De Bonet et al. | |
| 10,198,710 B1 | 2/2019 | Hahn et al. | |
| 10,746,589 B1 * | 8/2020 | Danenberg | H05K 7/14 |
| 10,809,122 B1 * | 10/2020 | Danenberg | A47F 5/103 |
| 10,830,633 B2 * | 11/2020 | Fiehn | G01G 23/017 |
| 10,969,267 B1 * | 4/2021 | Franklin | G01G 19/18 |
| 11,125,607 B1 * | 9/2021 | Justice | G01G 19/42 |
| 2003/0047603 A1 * | 3/2003 | Lustenberger | G01G 21/24 177/25.17 |
| 2003/0131672 A1 | 7/2003 | Norling | |
| 2004/0060372 A1 | 4/2004 | Hopkins | |
| 2006/0070463 A1 | 4/2006 | Walker | |
| 2006/0117871 A1 | 6/2006 | Wilner | |
| 2014/0165745 A1 | 6/2014 | Pascucci et al. | |
| 2014/0291042 A1 | 10/2014 | Tsutaya et al. | |
| 2016/0003696 A1 | 1/2016 | Longman et al. | |
| 2021/0199490 A1 * | 7/2021 | Fritsch | A47B 96/061 |

FOREIGN PATENT DOCUMENTS

| | | |
|---|---|---|
| DE | 102008056715 A1 | 5/2010 |
| EP | 0251175 A2 | 1/1988 |
| EP | 1319173 B1 | 6/2003 |
| WO | WO 2019220400 A1 | 11/2019 |

\* cited by examiner

SHELF BRACKET ASSEMBLY

CROSS-REFERENCE TO PRIOR APPLICATIONS

Priority is claimed to European Patent Application No. 19 220 148.1, filed on Dec. 30, 2019, the entire disclosure of which is hereby incorporated by reference herein.

FIELD

The present invention relates to a shelf bracket assembly having at least one load cell.

BACKGROUND

EP1319173B1 shows a shelving unit of a small parts storage system where the item that is removed is determined in an automated manner. The shelving unit includes a weighing unit. The technical teaching of the patent concerns calculating the exact location of removal of an item based on the weight measured by the weighing scale. However, no consideration is given to the practical implementation of the load cell in the shelving unit.

SUMMARY

In an embodiment, the present invention provides a shelf bracket assembly mounted upright on a vertically disposed shelf that has: a load cell; an anchor; and a cantilever supporting a shelf panel. The cantilever projects from the shelf upright in a substantially horizontal direction. The cantilever has a vertically disposed frame or a vertically disposed metal plate and a mount for the load cell. The load cell has a monolithic measuring body that has: a force-supporting section; a force-introduction section; and a linkage section between the force-supporting section and the force-introduction section. The force-supporting section of the monolithic measuring body is laterally attached to the mount. The monolithic measuring body has at least one mounting hole through which the monolithic measuring body is attached to the mount with a screw extending horizontally through the monolithic measuring body.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a shelf bracket assembly and a shelving unit with integrated weighing functionality, the load cell particularly accounting for the capability of being integrated with a shelf bracket assembly.

In accordance with the invention, there is provided a shelf bracket assembly having at least one load cell. The shelf bracket assembly includes an anchoring device capable of securing the shelf bracket assembly on a vertically disposed shelf upright. The shelf bracket assembly includes a cantilever for supporting a shelf panel. A shelf panel is, for example, a shelf board supported by at least two continuous or interrupted cross bars. The expression "interrupted cross bars" means that the shelf board includes two cross bars on either side thereof which, however, do not extend continuously along the underside of the shelf panel. A shelf panel is, for example, also a wire shelf panel supported by at least two continuous or interrupted cross bars. In a condition where the shelf bracket assembly is mounted on a shelf upright, the cantilever projects from the shelf upright in a substantially horizontal direction. In an embodiment, the cantilever is formed by a vertically disposed frame structure or a vertically disposed metal plate. Within the scope of this disclosure, this is understood to also include a triangular cantilever whose top or bottom side projects from the shelf upright in a substantially horizontal direction. Within the scope of this disclosure, this is understood to also include a triangular cantilever whose axis projects from the shelf upright in a substantially horizontal direction. The cantilever includes at least one mounting device for the at least one load cell. The at least one load cell has a monolithic measuring body including a force-supporting section, a force-introduction section, and a linkage section disposed between the force-supporting section and the force-introduction section. The force-supporting section of the measuring body is laterally attached to the mounting device. The measuring body has at least one mounting hole through which it is attached to the mounting device with a screw extending horizontally through the measuring body. In an embodiment, the load cell has a longitudinal axis between its force-introduction-side axial end and its force-supporting-side axial end. The longitudinal axis of the load cell extends parallel to the horizontal direction in which the cantilever projects from the shelf upright.

In an embodiment, the longitudinal axis of the measuring body and the axis of the mounting hole are orthogonal to each other. That is, the axis of the mounting hole and the longitudinal axis of the measuring body define horizontal directions and, thus, the position of the horizontal plane. In an embodiment, the linkage section forms a parallelogram linkage which is movable in the vertical direction, parallel to the vertically disposed frame structure or the vertically disposed metal plate of the cantilever. The load cell includes at least one strain gauge adapted to sense tensile or compressive deformation of the measuring body and disposed in the region of the linkage section on the top or bottom side of the measuring body. The strain gauge senses, in particular, the deformation of the linkage section. The at least one strain gauge is oriented in the horizontal direction. This has the advantage that the load cell can be fastened laterally to the mounting device with screws. With this type of attachment, the force-supporting section, and thus the entire load cell and, consequently, also the shelf bracket assembly, can be made particularly narrow.

In an embodiment, the at least one load cell at least partially supports the shelf panel via its force-introduction section.

In an embodiment, the shelf bracket assembly includes two mounting devices, to each of which is attached a load cell via its force-supporting section. The force-introduction sections of the two load cells each support a cross bar of the shelf panel. In an embodiment, support is effected in a torque-free manner; i.e., the cross bar is supported by the force-introduction sections of the load cells in such a way that no strain can occur. This is achieved in particular by the fact that the cross bar rests on the force-introduction section and is not fastened with screws thereto. This is advantageous when the shelf panel is supported by a plurality of load cells forming what is known as a multi-point measurement system. In an embodiment, the shelf panel is supported only on force-introduction sections of load cells and not on any other rigid part of the shelf bracket assembly. This prevents force shunting and thereby precludes erroneous weight measurements resulting therefrom.

In an embodiment, the at least one strain gauge is formed by a resistive track configured in parallel meanders and oriented parallel to the longitudinal axis of the measuring body.

In an embodiment, the linkage section includes at least one, in particular two, narrowed portions at an upper linkage member, and at least one, in particular two, narrowed portions at a lower linkage member extending parallel to the upper linkage member.

In an embodiment, the load cell includes, in the region of each of the two narrowed portions of the upper linkage member, a strain gauge disposed on the top side of the upper linkage member. In an embodiment, the load cell additionally includes, in the region of each of the two narrowed portions of the lower linkage member, a strain gauge disposed on the bottom side of the lower linkage member. The four strain gauges of the load cell are interconnected to form a Wheatstone bridge. In an embodiment, the interconnection of the two strain gauges disposed on the top side and the two strain gauges disposed on the top side are provided on a strain gauge film. In an embodiment, the interconnection of the two strain gauges disposed on the bottom side and the two strain gauges disposed on the bottom side are provided on a strain gauge film.

In an embodiment, the load cell includes, in the region of each of the two narrowed portions of the upper linkage member, two strain gauges disposed on the top side of the upper linkage member. The respective two strain gauges are oriented in parallel and arranged adjacent to each other with respect to a narrow side of the measuring body. The four strain gauges of the load cell are interconnected to form a Wheatstone bridge. In an embodiment, the interconnection of the strain gauges and the strain gauges are provided on a strain gauge film. In other words, this means that the four strain gauges are interconnected to form a Wheatstone bridge. The strain gauges are all oriented in the same direction, namely parallel to the longitudinal axis of the measuring body. The four strain gauges are arranged in pairs, the strain gauges of each pair of strain gauges being positioned adjacent to each other with respect to their orientation. Each pair of strain gauges is attached to the top side of the upper linkage member. A pair of adjacent strain gauges is located in the region of each of the two narrowed portions of the upper linkage member of the measuring body.

In an embodiment, all narrowed portions have the same thickness. In an embodiment, all narrowed portions have the same shape.

In an embodiment, the force-introduction section of the measuring body is formed on the top surface with a bore in which the object to be measured is threadedly fastened. In an embodiment, the force-introduction section has a receptacle in the form of a recess originating at the top side of the measuring body and extending perpendicularly to the longitudinal axis. In an embodiment, the recess of the receptacle is formed in the narrow direction of the measuring body over the entire width of the measuring body. In an embodiment, the recess of the receptacle has a round contour at its side facing away from the top side of the measuring body. This recess is to be formed during the manufacture of the measuring body, for example, by drilling a hole into the measuring body in a direction parallel to the narrow side of the measuring body. This hole is then milled out toward the top side of the measuring body. In an embodiment, the load cell includes an insert, which is in form-fitting engagement with the round contour of the receptacle. At its side opposite the form-fitting engagement with the round contour, the insert has a rectangular contour for receiving a force-transmitting member. That is, the insert is substantially U-shaped.

In an embodiment, the force-transmitting member is configured such that it can be form-fittingly received in the rectangular contour of the insert. That is, the force-transmitting member has substantially the shape of an inverted U. The force-transmitting member has an edge for supporting a cross bar of a shelf panel. Thus, the cross bar is not rigidly connected to the measuring body, which results in torque-free reception of forces. In other words, the measuring body is not strained by a rigidly connected cross bar. Torque-free support is particularly advantageous because the weighing of the shelf panel is accomplished through multi-point measurements during which the rigid shelf panel is weighed using a plurality of load cells.

In an embodiment, the measuring body is mirror-symmetric with respect to a horizontal plane which extends through the measuring body at half its height. A receptacle for an insert is also formed at the bottom side of the measuring body. This side is not intended for the introduction of a force to be measured. However, the measuring body may serve as a measuring body for a load cell when in a position rotated 180°, so that the bottom side becomes the top side. In this orientation, the force is then introduced via the formerly lower receptacle. This has the advantage that the measuring body may serve as a basis for load cells which are attached to one or the other of the mounting devices of the shelf bracket assembly. If the shelf bracket assembly is constructed such that the two mounting devices are disposed near the center and not at the ends of the cantilever in the horizontal direction, then one of the measuring bodies is rotated 180° with respect to the other. However, due to the symmetrical design, it is possible to use identically constructed measuring bodies as a basis for the two 180°-rotated load cells. Disposing the mounting devices near the center is advantageous because the force-introduction sections are then near the ends of the cantilever, and the cross bars of the shelf panel, which rest on the force-introduction sections of the load cells, can then be mounted in the outer regions of the shelf panel, as a result of which the shelf panel is stably supported by the load cells. In an embodiment, the measuring body has a length along its longitudinal axis, a height from the top side of the upper linkage member to the bottom side of the lower linkage member, and a width in the dimension that is orthogonal to the length and height. The width of the measuring body is between 3 mm and 40 mm, in particular between 5 mm and 20 mm. The length of the measuring body is 15 to 25 times, in particular 16 to 20 times, the width. The height of the measuring body is 5 to 10 times, in particular 5 to 8 times, the width of the measuring body. In comparison to known prior art load cells, the measuring body of the load cell according to the invention is very narrow in width and very large in height. This has the advantage that the measuring bodies can be optimally installed in a shelf bracket assembly with little effect on the dimensions of the shelf bracket assembly. It is desirable to optimize the shelf bracket assembly for small width, which can be achieved using a load cell that is based on this measuring body. Due to the changed dimensions, the mechanical behavior of the measuring body under the action of a force exerted from above differs strongly from that of conventional load cells. This dimensioning has, in particular, the surprising advantage that, because of the shape of the measuring body, the narrowed portions need not be finished separately, and above all not individually. Due to the dimensioning of the measuring body, tolerances have a lesser impact on measurements. Thus, all four narrowed portions can be configured identically, whereas in prior art measuring bodies, the narrowed portions at the top and bottom of the linkage section have different thicknesses and must frequently be individually finished; i.e., balanced, during manufacture.

In an embodiment, the length of the force-introduction section along the longitudinal axis of the measuring body is between 15% and 25%, in particular 20%, of the length of the measuring body. The length of the linkage section along the longitudinal axis of the measuring body is between 20% and 30%, in particular 25%, of the length of the measuring body. The length of the force-supporting section along the longitudinal axis of the measuring body is between 65% and 45%, in particular 55%, of the length of the measuring body. In an embodiment, the measuring body includes at least three, in particular four, mounting holes formed as bores and extending through the measuring body in the horizontal direction, with particularly the bores on one side being provided with countersinks configured to receive countersunk screw heads. In contrast to known load cells, the force-supporting section is relatively large. This allows the screws for attaching the measuring body to be disposed in a direction transverse to the direction of deformation. Thus, the axes of the mounting screws are oriented parallel to the width of the measuring body; i.e., along its smallest dimension. The large surface area of the force-supporting section provides for stable mounting of the measuring body to the mounting device without appreciable mechanical stresses arising in the region of the mounting holes as a result of forces introduced into the force-introduction section. Thus, the mounting holes do not affect the measurement accuracy.

In an embodiment, the measuring body has a depression extending along its longitudinal axis from a linkage-section-proximate portion of the force-supporting section to the linkage section and adapted to at least partially receive a circuit board having electronics mounted thereon, in particular an analog-to-digital converter for processing at least one output signal from the at least one strain gauge.

In an embodiment, the shelf bracket assembly includes two mounting devices on either side of the vertically disposed frame structure or on either side of the vertically disposed metal plate. Each of the four mounting devices carries a load cell. Each of two load cells located on the same side of the frame structure or of the vertically disposed metal plate carries an end of a cross bar of a shelf panel. Such a shelf bracket assembly may be employed as a center shelf bracket assembly in a run of shelving, so that shelf panels are provided on both sides of the shelf bracket assembly.

The invention also relates to a shelving unit formed by at least two vertically disposed shelf uprights and at least two shelf bracket assemblies disposed at the same height, each on a respective one of the shelf uprights. The shelving unit further includes at least one shelf panel placed on the two shelf bracket assemblies disposed at the same height. The shelf panel includes two cross bars, which are configured parallel to each other and supported at their ends on the force-introduction sections of two load cells, respectively. The shelving unit includes an evaluation unit which determines new center-of-mass coordinates from the data from the load cells, either at periodic intervals or upon a change in the total weight that is sensed by the four load cells on whose force-introduction sections the shelf panel rests. These center-of-mass coordinates are transmitted to a control unit. The control unit determines a shelf region on the shelf panel based on changes in the center-of-mass coordinates. The control unit determines, from the change in total weight, the weight of the pieces of merchandise removed from or added to the determined shelf region and updates the inventory stored in a memory for this shelf region.

In an embodiment, upon a change in total weight, the evaluation unit determines a vector between the previous center-of-mass coordinates and the new center-of-mass coordinates. The shelf region determined by the control unit is calculated by the control unit from the vector and the total weight.

In an embodiment, the evaluation unit tares all load cells periodically and simultaneously. The center-of-mass coordinates calculated from the data from the load cell represent the center of mass where something was removed from or added to the shelf panel. In an embodiment, in order to determine the new center-of-mass coordinates, the evaluation unit calculates, for each load cell, the difference between a new weight value and a previous weight value. That is, when a product is removed from or added to the shelf panel, the change in weight is determined at each load cell separately. The new center-of-mass coordinates are calculated from the four differential values; that is, from the change in weight at each load cell. Both embodiments provide for the weight values measured by the four load cells to be considered separately, rather than for calculating a vector that needs to be scaled. Thus, these two embodiments are less sensitive to tolerances during the determination of weight values by the load cells.

Figure 1:
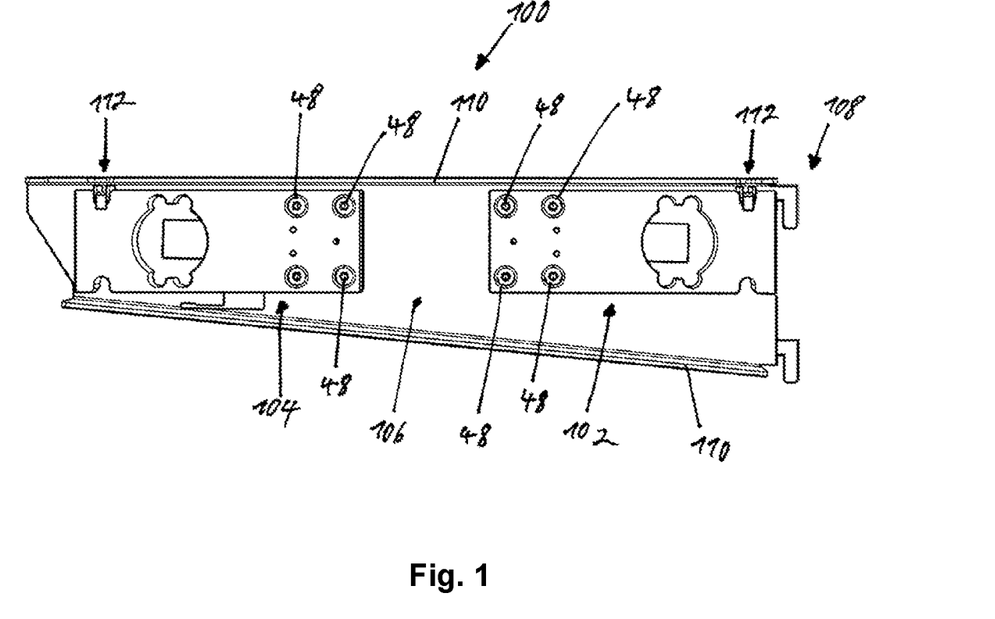
FIG. 1 is a side view of an inventive shelf bracket assembly with two load cells.
Figure 2:
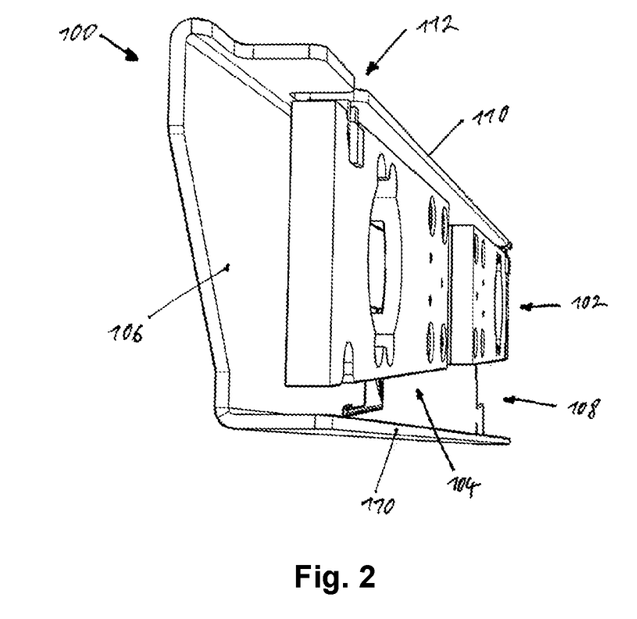
FIG. 2 is an isometric view of an inventive shelf bracket assembly with two load cells.

FIG. 1 shows a shelf bracket assembly 100 in a side view, and FIG. 2 shows it in an isometric view from the front. Shelf bracket assembly 100 includes a vertical cantilever 106 formed of a vertical metal plate. To increase stability and to protect load cells 102, 104 mounted on bracket assembly 100, cantilever 106 is has a flange 110 at its top and at its bottom. At one axial end of cantilever 106, shelf bracket assembly 100 includes an anchoring device 108 in the form of two hooks, by which the shelf bracket assembly can be mounted on a shelf upright. Shelf uprights are often configured as vertically mounted rails having slots arranged one above the other, so that the shelf bracket assemblies can be mounted at different heights on the shelf upright. Two bracket assemblies 100 mounted on two spaced-apart shelf uprights at the same height support a shelf panel, thus forming a shelf compartment. Cantilever 106 is triangular in shape; that is, the cantilever has a greater height in the region of anchoring device 108 than at the opposite axial end, which corresponds to the front region of the shelf compartment. Upper flange 110 includes, for each of load cells 102, 104, a respective opening 112 allowing a cross bar of the shelf panel to pass therethrough when the shelf panel rests with the cross bar on a force-introduction section of load cell 102, 104. The two load cells 102, 104 are each fastened with four countersunk screws 48 to a mounting device. An optional cover is attached to upper and lower flanges 110 and extends parallel to cantilever 106 on the opposite side of the load cells 102, 104 to mechanically protect load cells 102, 104. The optional cover also has an opening in each region corresponding to the region of an opening 112 in flange 110 to allow the cross bars of the shelf panel to rest on the force-introduction sections of load cells 102, 104. Load cells 102, 104 are symmetrical in configuration, so that they are mounted with their force-supporting sections toward the center of cantilever 106 and the force-introduction sections of load cells 102, 104 are disposed toward the axial ends of cantilever 106. Thus, load cells 102, 104 support the shelf panel in the region of its corners.

Figure 3:
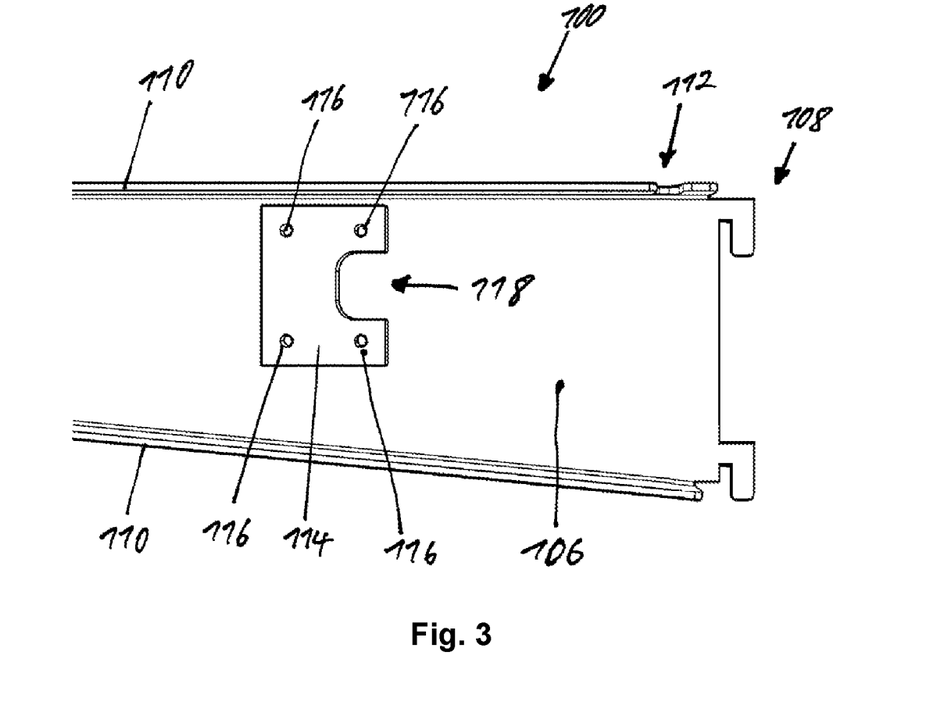
FIG. 3 is a detail view of an inventive shelf bracket assembly with a mounting device for a load cell, shown in a first side view.

FIG. 3 shows a portion of a shelf bracket assembly, including anchoring device 108 and a portion of cantilever 106. Shown is a mounting device 114, which is attached to cantilever 106 and suitable for holding a load cell by its force-supporting section. Mounting device 114 includes four bores 116 which receive the screws for fastening the load cell. The mounting device 114 further includes a receptacle 118, in which a circuit board of the load cell is at least partially received.

FIGS. 1 through 3 show a shelf bracket assembly 100 which, when viewed from the front, forms the left shelf bracket assembly of a shelf compartment. A shelf compartment must also include a right shelf bracket assembly, so that the shelf panel is supported on the left side by the left shelf bracket assembly and on the right by the right shelf bracket assembly. The right shelf bracket assembly is configured mirror-symmetrically to the left shelf bracket assembly. For shelving systems where a plurality of shelf compartments are arranged side-by-side in a row, there are shelf bracket assemblies which support the corners of a shelf panel on each of its left and right sides. Such a shelf bracket assembly includes four load cells, two additional load cells being disposed behind cantilever 106 symmetrically to the front load cells 102, 104, as viewed in FIG. 2.

Figure 4:
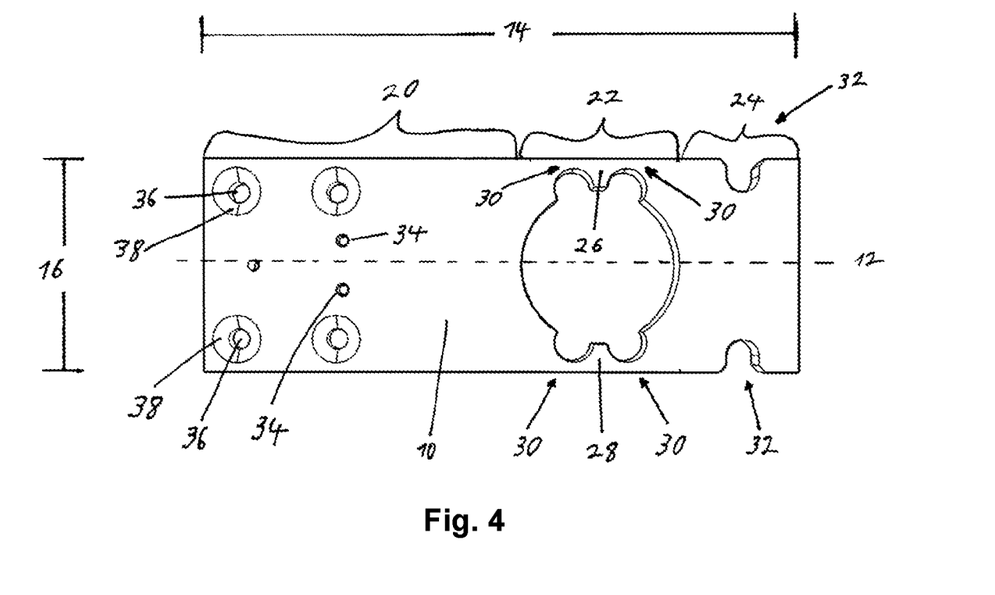
FIG. 4 is a side view of a measuring body for a shelf bracket assembly according to the invention.

FIG. 4 schematically shows, in a first side view (front view), a measuring body 10 for a load cell 102, 104 of a shelf bracket assembly 100. Measuring body 10 serves as a deformable body, a weight force acting on measuring body 10 being inferred from the deformation of the deformable body. Measuring body 10 includes a force-introduction section 24, a linkage section 22, and a force-supporting section 20. A weight force to be measured is applied to force-introduction section 24. Via its force-supporting section 20, measuring body 10 is attached to a mounting device 114 of a shelf bracket assembly 100. Measuring body 10 has a longitudinal axis 12 between its force-supporting-side axial end and its force-introduction-side axial end. Along its longitudinal axis 12, the measuring body has an extent in the longitudinal direction, a length 14. Orthogonally to its extent along longitudinal axis 12, the measuring body has an extent in the vertical direction, a height 16. The measuring body has an extent in a third dimension, rearward in FIG. 1, a width 18 (see FIG. 7). By way of example, a measuring body 10 has a width 18 of 10 mm, a height 16 of 65 mm, and a length 14 of 180 mm. Along longitudinal axis 12, force-introduction section 24 covers approximately 20% of length 14 of measuring body 10, linkage section 22 covers approximately 25%, and force-supporting section 20 covers approximately 55% of length 14. In the view of FIG. 4, measuring body 10 is symmetric along a horizontal plane that divides the measuring body centrally in the height direction. Force-introduction section 24 is provided with a receptacle 32 which completely penetrates measuring body 10 in the direction of its width 18. Receptacle 32 takes the form of a bore formed in the region of the top side of the measuring body, the bore being milled out toward the top side of measuring body 10. Accordingly, in a direction toward measuring body 10, receptacle 32 has a round contour in measuring body 10. Another receptacle is formed at the bottom side of measuring body 10 in the region of the force-introduction section. In the region of the linkage section, measuring body 10 is penetrated by a round opening over a substantial portion of its height. In the upper and lower regions of the penetration created in this manner, there are respectively formed two smaller round openings which also completely penetrate measuring body 10. Thus, measuring body 10 is formed with an upper linkage member 26 having two narrowed portions 30 and a lower linkage member 28 having two narrowed portions 30. Narrowed portions 30 have the effect that linkage member 22 is deformed in response to forces acting on force-introduction section 24. Linkage member 22 is a parallelogram linkage. Force-supporting section 20 of measuring body 10 has four mounting holes 36 formed therein which also penetrate measuring body 10 in the direction of its width 18. Mounting holes 36 are provided with countersinks 38, so that measuring body 10 can be screwed to the mounting device 114 of a shelf bracket assembly 110 with countersunk screws 48. Furthermore, force-supporting section 20 of measuring body 10 is provided with bores 24 for attachment of a circuit board.

Figure 5:
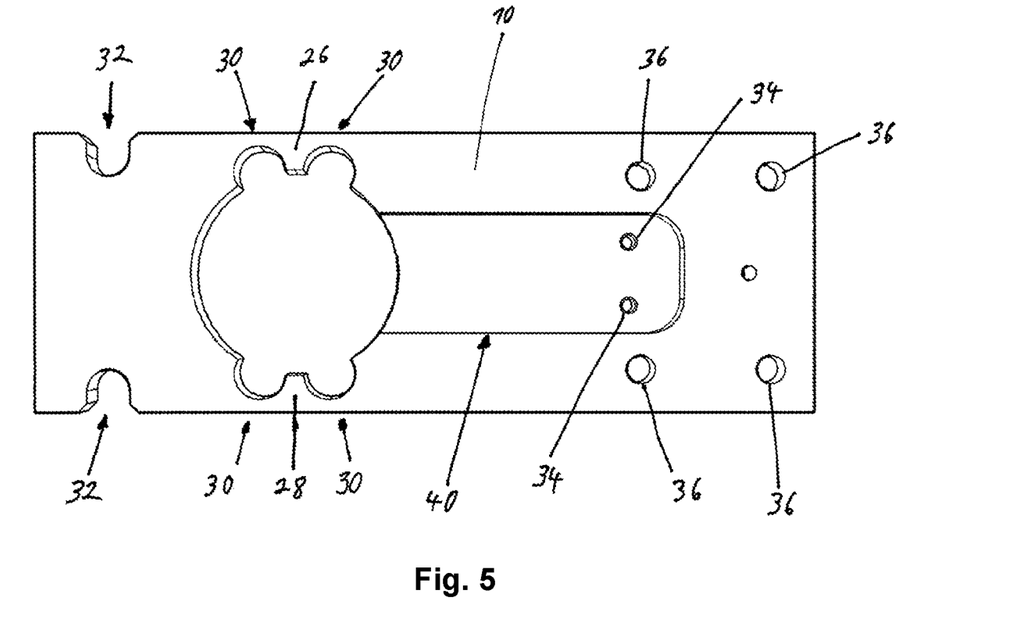
FIG. 5 is a second side view of a measuring body for a shelf bracket assembly according to the invention.

FIG. 5 shows a measuring body 10 according to FIG. 4 in a second side view (rear view). In this view, the measuring body of FIG. 4 is shown rotated along a vertical axis. Located in the region of force-supporting section 20 is a depression 40 extending to linkage section 22. Depression 40 does not penetrate measuring body 10 and does not provide additional deformability of measuring body 10. The bores 34 for attachment of a circuit board are located within depression 40. Depression 40 is designed to at least partially receive a circuit board, the circuit board having electronics mounted thereon, in particular an analog-to-digital converter for processing at least one output signal from the at least one strain gauge.

Figure 6:
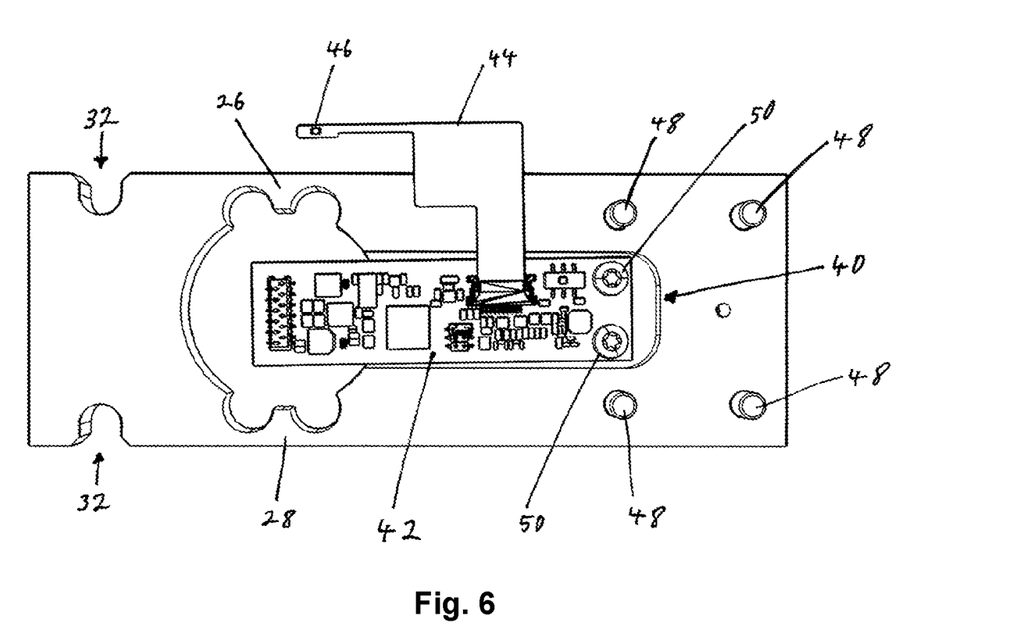
FIG. 6 is a second side view of a load cell for a shelf bracket assembly according to the invention.

FIG. 6 shows the load cell in rear view. The orientation of measuring body 10 is the same as in FIG. 5. Shown in mounting holes 36 are screws 48, which serve to threadedly fasten the load cell via its force-supporting section 20 to a mounting device 114. Circuit board 42 is fastened within depression 40 of measuring body 10 with screws 50 in the bores 34 for circuit board 42. Connected to circuit board 42 is a conductor film 44 which serves for electrically contacting the strain gauges. Conductor film 44 has provided thereon a temperature sensor 46 which serves for temperature equalization purposes. When screwed to a mounting device 114 of a shelf bracket assembly 100, circuit board 42, or the electronics mounted on circuit board 42, extends into receptacle 118 of mounting device 114. Mounting device 114 also serves as a spacer between load cell 102, 104 and cantilever 106, so that circuit board 42 can be accommodated in this space.

Figure 7:
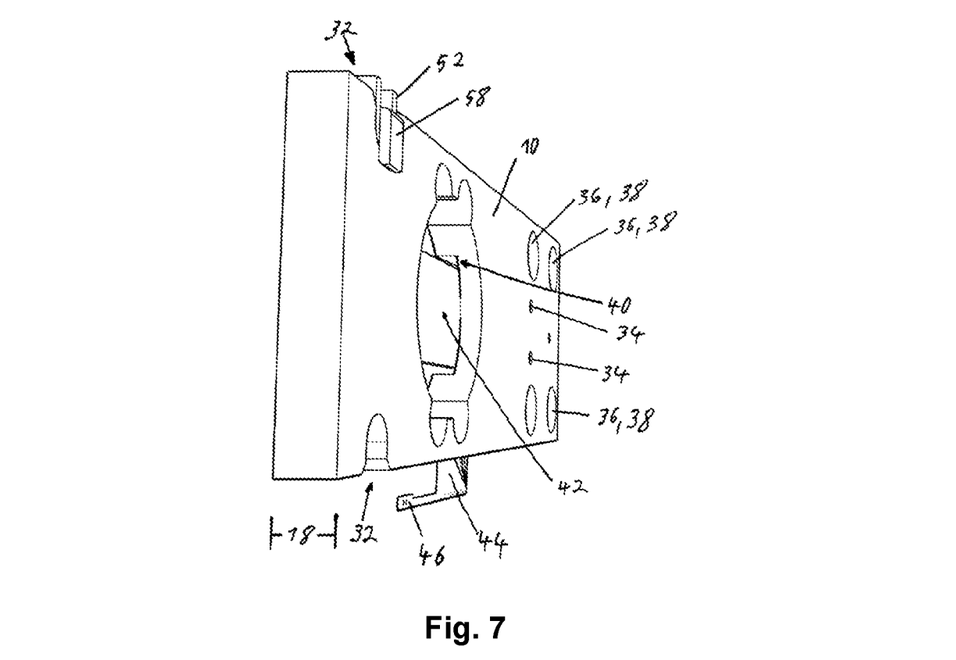
FIG. 7 is an isometric view of a load cell for a shelf bracket assembly according to the invention.

FIG. 7 shows, in isometric view, a load cell having a measuring body 10. As can be readily seen in this view, width 18 of measuring body 10 is very small in relation to its height 16 and to its length 14. Furthermore, in FIG. 7, circuit board 42 located in depression 40 of measuring body 10 can be seen through the opening in linkage section 22. An insert 52 and a force-transmitting member 58, which will be described in more detail below, are shown in upper receptacle 32 of measuring body 10. Because the load cell has a narrow width 18, it is ideally suited for attachment to a shelf bracket assembly 100, since a shelf bracket assembly 100 is preferably long and high in the direction of its extent along the shelf compartment and very narrow in a direction perpendicular thereto. Owing to the small width 18 of the load cell, integration of a load cell 102, 104 does not make it necessary to deviate significantly from this dimensioning of the shelf bracket assembly. A narrow load cell is fundamentally advantageous for integration with a shelf bracket assembly 100 and with a shelving unit.

Figure 8:
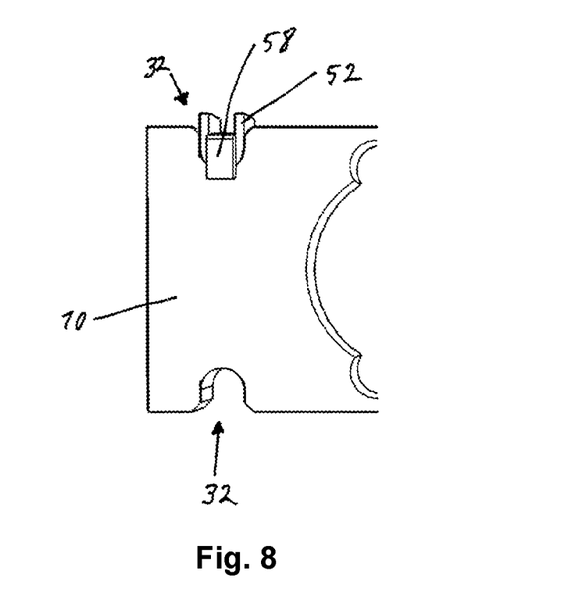
FIG. 8 is a first side view of the force-introduction section of a load cell, shown with an insert and a force-transmitting member.
Figure 9:
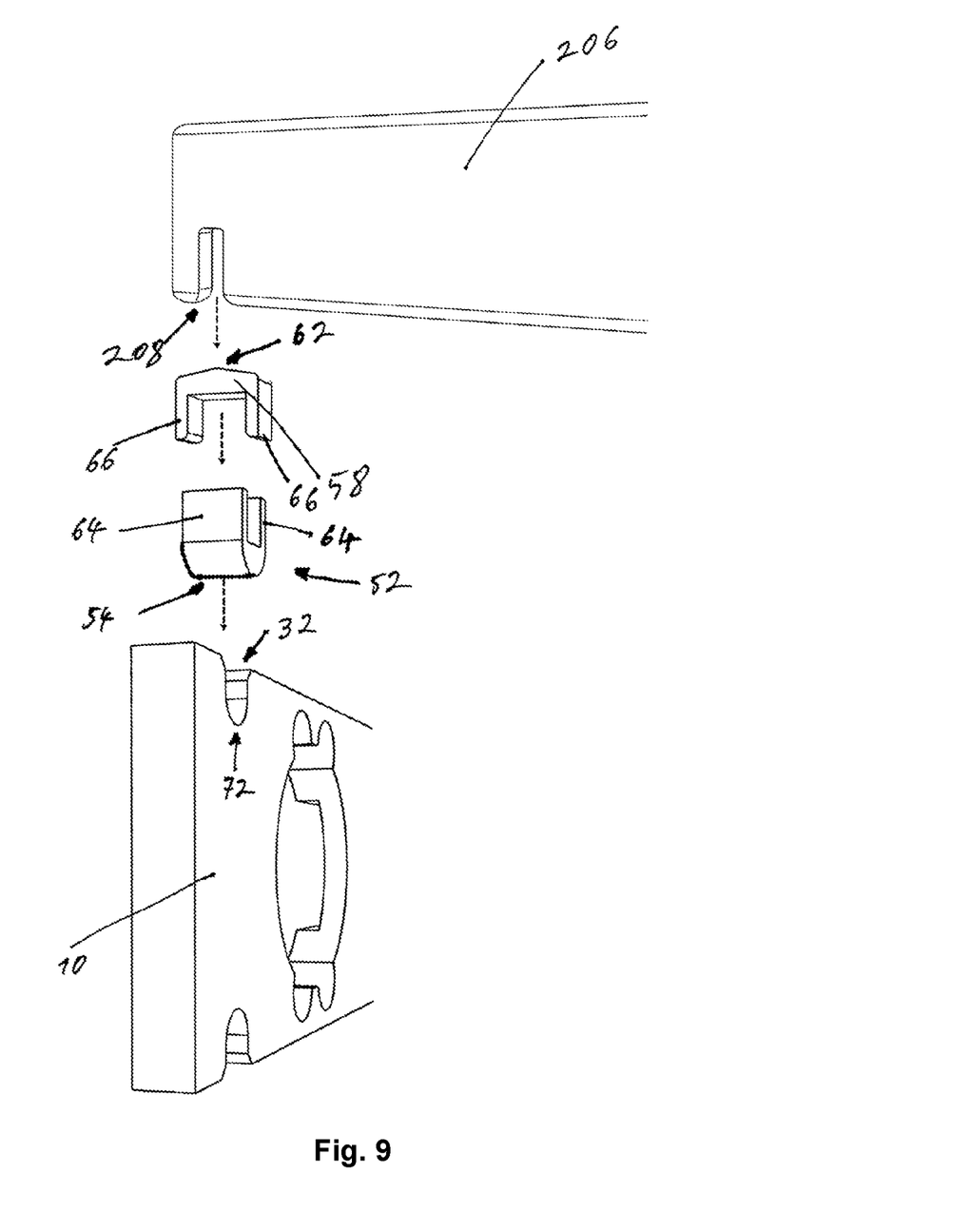
FIG. 9 is an exploded view showing the force-introduction section with an insert and a force-transmitting member as well as a shelf cross bar.

FIG. 8 depicts the force-introduction section 24 of a measuring body 10 with an insert 52 in form-fitting engagement with the round contour of receptacle 32 of the measuring body. Insert 52 holds a force-transmitting member 58. To illustrate the interaction of receptacle 32, insert 52, and force-transmitting member 58, FIG. 9 shows measuring body 10, insert 52, force-transmitting member 58, and a cross bar 206 of a shelf panel in exploded isometric view. Insert 52 is inserted into receptacle 32, with round contour 54 at the bottom side of insert 52 coming into form-fitting engagement with round contour 72 of receptacle 32 of measuring body 10. Insert 52 is substantially U-shaped and has a rectangular contour at its inner side. The width of insert 52 is equal to width 18 of measuring body 10. Force-transmitting member 58 is also substantially U-shaped, but rotated 90° about a vertical axis with respect to insert 52. Moreover, force-transmitting member 58 is rotated 180° about a horizontal axis with respect to insert 52. At its inner side, force-transmitting member 58 has a rectangular contour designed to rest on the rectangular contour of insert 52. Force-transmitting member 58 is disposed such that its limbs 66 reach beyond insert 52 and partially project over measuring body 10, so that the U-shaped configuration of force-transmitting member 58 prevents insert 52 from slipping out of receptacle 32 and also prevents force-transmitting member 58 itself from slipping relative to measuring body 10. At its top side, force-transmitting member 58 has an edge 62; i.e., an acute contact axis for the cross bar of a shelf panel. In the assembled condition of insert 52 and force-transmitting member 58, edge 62 of force-transmitting member 58 is oriented parallel to longitudinal axis 12 of measuring body 10. Limbs 64 of insert 52 reach beyond edge 62 of force-transmitting member 58, so that they form a boundary for the edge along longitudinal axis 12 of measuring body 10. Limbs 64 of insert 52 form a boundary for the cross bar 206 of the shelf panel. Cross bar 206, which rests with a notch 208 on edge 62 of force-transmitting member 58 and is weighed, is prevented by limbs 64 of insert 52 from slipping beyond edge 62 of force-transmitting member 58 in the direction of longitudinal axis 12 of measuring body 10. Thus, cross bar 206 rests in a torque-free manner on force-introduction section 24 of load cell 102, 104, which is required, in particular, because the rigid shelf panel rests with its cross bars 206 on four load cells 102, 104, and because force-introduction sections 24 of load cells 102, 104 must not be mutually strained by the rigid shelf panel.

Figure 10:
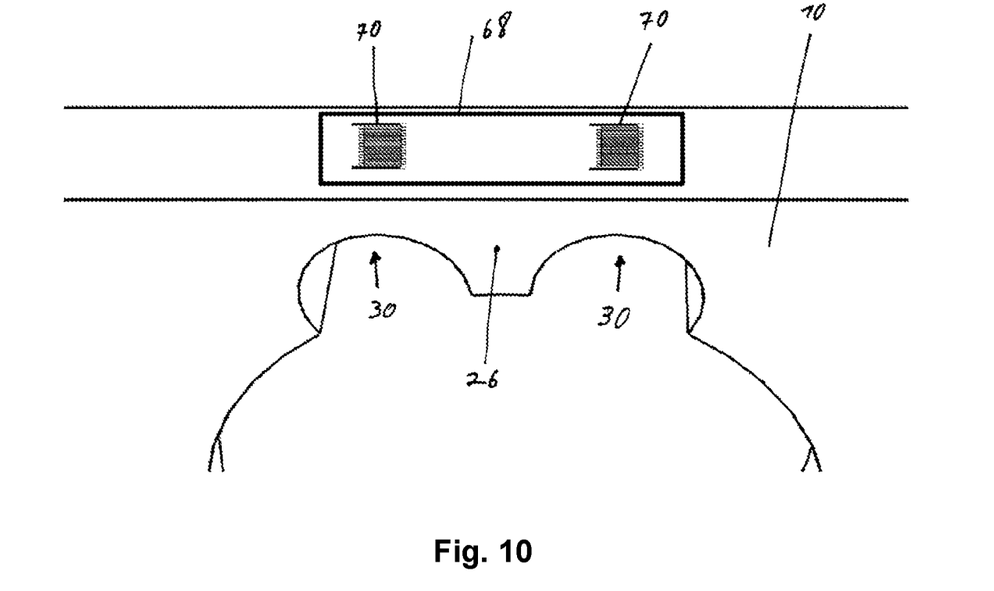
FIG. 10 is an isometric view showing a measuring body of a load cell of an inventive shelf bracket assembly with two strain gauges on the upper linkage member.
Figure 11:
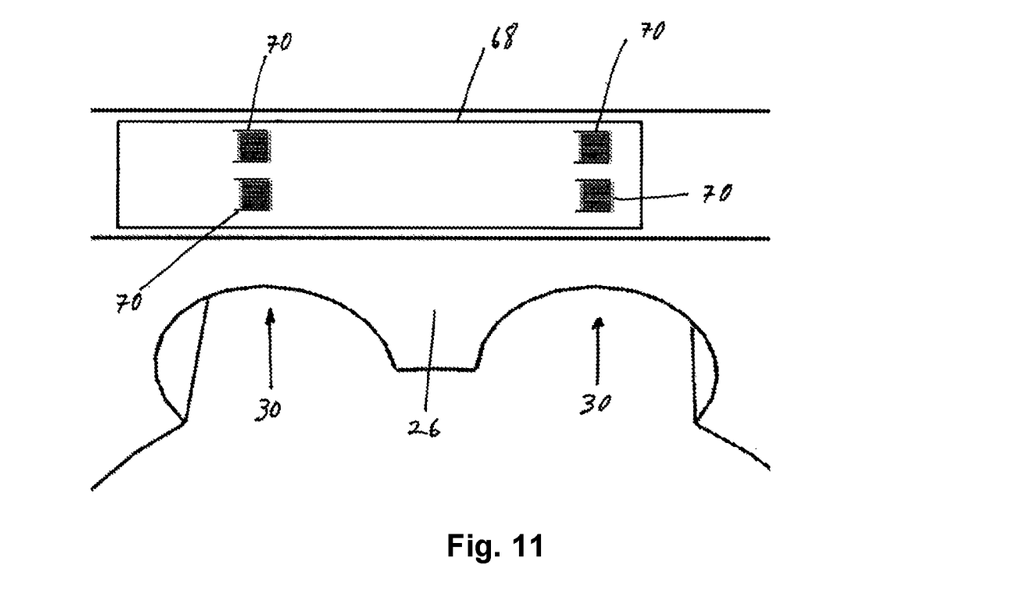
FIG. 11 is an isometric view showing a measuring body of a load cell of an inventive shelf bracket assembly with four strain gauges on the upper linkage member.

FIG. 10 shows an isometric top view of linkage section 22 of measuring body 10 of load cell 102, 104. A strain gauge film 68 with two strain gauges 70 is attached to narrowed portions 30 of upper linkage member 26. The two strain gauges 70 and two further strain gauges, which are attached to the bottom side of lower linkage member 28, are interconnected to form a Wheatstone bridge (bridge circuit). Strain gauges 70 are electrically contacted to conductor film 44 and thus to circuit board 42 of the load cell. FIG. 11 shows an isometric top view of the linkage section of measuring body 10 of a second variant of the load cell. A strain gauge film 68 with four strain gauges 70 is attached to narrowed portions 30 of upper linkage member 26. The four strain gauges 70 are interconnected on the strain gauge film to form a Wheatstone bridge, and are electrically connected to circuit board 42 via conductor film 44. The orientation of the meandering resistive traces of strain gauges 70 on upper linkage member 26, or on upper and lower linkage members 26, 28, is always in the direction of longitudinal axis 12 of measuring body 10. Strain gauges 70 are each oriented in the horizontal direction. That is, the surface created by the meandering arrangement of the resistive traces of strain gauge 70 is horizontal, so that strain gauges 70 are disposed on the top side of upper linkage member 26 or on the bottom side of lower linkage member 28. The orientation of this surface in a Cartesian coordinate system corresponds to the orientation of the narrow long side of measuring body 10.

Figure 12:
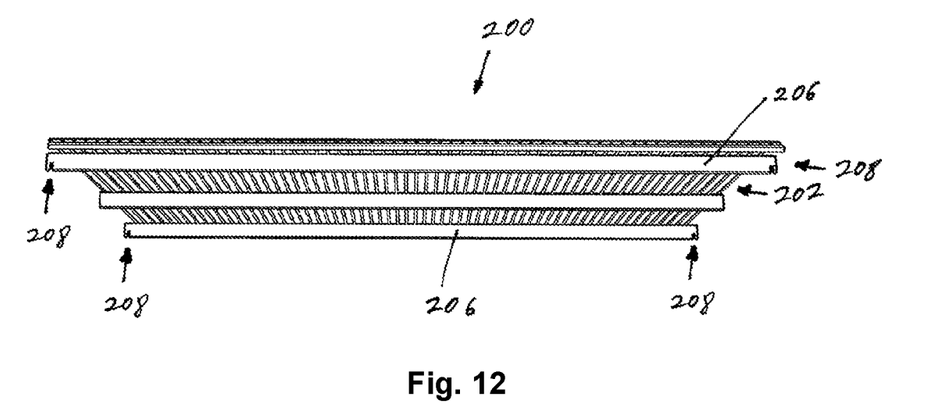
FIG. 12 is a view showing a shelf panel.

FIG. 12 shows a shelf panel 200 in the form of a wire shelf panel. Shelf panel 200 includes a rigid mesh structure 202 on which items in the shelving unit can be placed. Mesh structure 202 is supported by at least two cross bars 206 extending transversely along shelf panel 200 and located in the front and rear regions of shelf panel 200. Cross bars 206 are formed at each of their ends with a notch 208, with which the cross bars can be supported in a torque-free manner on a respective edge 62 of a force-transmitting member 58. Thus, the shelf panel can be supported on force-transmitting members 58 of four load cells 102, 104.

Figure 13:
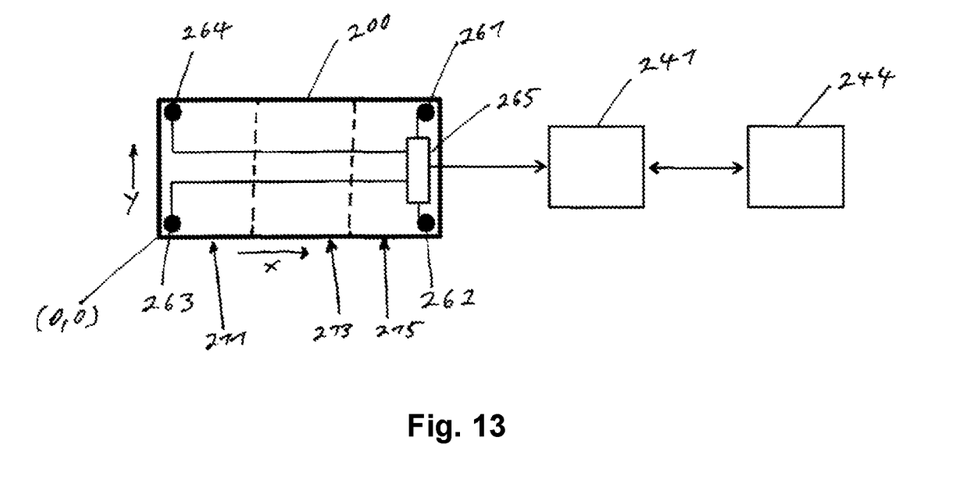
FIG. 13 is a block diagram of a shelving unit according to the invention.

FIG. 13 schematically shows three shelf regions 211, 213, 215 on a shelf panel 200, and corresponding components for inventory monitoring. The determination of the shelf region 211, 213, 215 where a product was removed from or added to shelf panel 200 is accomplished through center-of-mass determination of shelf panel 200.

Shelf panel 200 is floatingly supported by the four load cells 261, 262, 263, 264. These are the load cells 102, 104 which are integrated with shelf bracket assemblies 100. Shelf panel 200 is supported by a shelf bracket assembly 100 on the left of shelf panel 200 and a shelf bracket assembly 100 on the right of shelf panel 200. Shelf panel 200 is supported at the ends of its cross bars 206 by load cells 261, 262, 263, 264 via their force-introduction sections 24. Load cells 261, 262, 263, 264 determine, independently of one another, a weight force exerted by shelf panel 200 and the products placed in shelf regions 211, 213, 215. Individual weight forces, each equivalent to a portion of the total weight, act on respective ones of load cells 261, 262, 263, 264. The data from load cells 261, 262, 263, 264 are transmitted to an evaluation unit 265. The evaluation unit determines center-of-mass coordinates of shelf panel 200 from the individual weight data from load cells 261, 262, 263, 264. The coordinates in shelf regions 211, 213, 215 start in a corner at load cell 263 with the coordinates (0, 0) and increase in horizontal direction X and in vertical direction Y.

To illustrate the center-of-mass determination, load cells 261, 262, 263, 264 are associated with corresponding weight data W261, W262, W263, W264 as illustrated in FIG. 13.

The determination of the center of mass in the X direction is as follows:

(W261+W262)/(W261+W262+W263+W264)

The determination of the center of mass in the Y direction is as follows:

(W261+W264)/(W261+W262+W263+W264)

Using a suitable scale factor that accounts for the size of shelf panel 200, it is possible to determine coordinates in shelf region 211, 213, 215 which correspond to the center-of-mass coordinates of shelf panel 200. These coordinates are determined in evaluation unit 265 based on the data from load cells 261, 262, 263, 264. Furthermore, evaluation unit 265 calculates a total weight W261+W262+W263+W264. The center-of-mass coordinates and the total weight are transmitted by evaluation unit 265 to a control unit 241. The shelving unit includes a memory 244 in which is stored an association between center-of-mass coordinates and shelf regions 211, 213, 215. Memory 244 further has stored therein, for each shelf region 211, 213, 215, the average weight of a piece of merchandise in this shelf region 211, 213, 215. Memory 244 has stored therein, for each shelf region 211, 213, 215, the current inventory; i.e., the current number of pieces of merchandise in this shelf region 211, 213, 215. This configuration can be used not only to measure the shelf regions 211, 213, 215 shown in FIG. 13, which are arranged side-by-side in the X direction, but also to measure shelf regions which are arranged in rows and columns in the X and Y directions; i.e., in a matrix.

Figure 14:
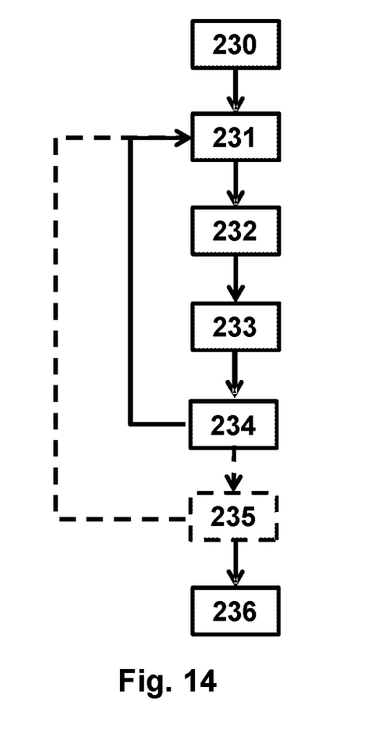
FIG. 14 illustrates a method for operating a shelving unit.

FIG. 14 shows a method for monitoring the inventory in a shelving unit, the method being executed by a control unit 241. In step 230, shelf regions 211, 213, 215 of shelf panel 200 are stocked with merchandise. In memory 244, each shelf region 211, 213, 215 is associated with the merchandise, and a weight per piece is stored therein. This is the average weight per piece, since the weight of bakery products, for example, may vary slightly. However, the variations are within a range and statistically distributed such that they are irrelevant to the method. In addition, memory 244 has stored therein, for each shelf region 211, 213, 215, the number of pieces of merchandise that are located on shelf panel 200 after the shelf is stocked. Also stored in memory 244 are the X and Y coordinates of each shelf region 211, 213, 215. Since the X and Y coordinates do not change, they do not need to be stored again each time the shelf is stocked. However, if the size of the shelf regions 211, 213, 215 and their arrangement are changed by rearranging the shelf dividers, then the association between X and Y coordinates and shelf regions 211, 213, 215 must be updated in memory 244. Thus, memory 244 has stored therein, for each shelf region 211, 213, 215, the range of X and Y coordinates over which the respective shelf region extends. Furthermore, memory 244 has stored therein, for each shelf region 211, 213, 215, a threshold value which, when no longer met, is intended to cause the shelf unit to output a message indicating that the respective shelf region 211, 213, 215 needs to be replenished with merchandise. In step 231, an evaluation unit 265 determines, from the weight values from load cells 261, 262, 263, 264, a location where one or more pieces of merchandise were removed or added, and also determines the total weight of the removed or added merchandise. The determination in step 231 may be performed using three alternative methods, which will be described below with reference to FIG. 15 through FIG. 17. In step 232, based on the coordinates of the location where something was removed or added and using the information stored in memory 244 about the arrangement of shelf regions 211, 213, 215, control unit 241 determines the respective shelf region 211, 213, 215. In step 233, the number of pieces of merchandise that were removed from or added to shelf region 211, 213, 215 is determined from the determined total weight of the removed merchandise and the weight value of a piece of merchandise associated with shelf region 211, 213, 215 in memory 244. Thus, the number of removed items is determined. In step 234, the current inventory associated with shelf region 211, 213, 215 is reduced by the number of removed pieces of merchandise or increased, as the case may be. The method is then continued with step 231, in which additional merchandise is removed or added. If a threshold value stored in memory 244 for the inventory in a shelf region 211, 213, 215 is no longer met, then, in step 235, the method sends a message to an operator informing the operator that the inventory has reached a low level and needs to be replenished. In step 236, the operator enters new inventory information after stocking a shelf region 211, 213, 215 with new merchandise. The information stored in memory 244 about the inventory in this shelf region 211, 213, 215 is then correspondingly updated in response to the operator input.

Figure 15:
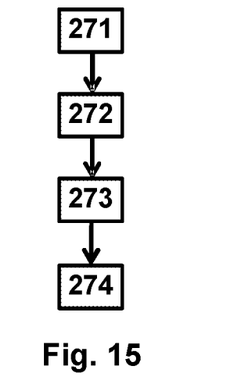
FIG. 15 illustrates a first method for determining a location on the shelf panel where a product was removed or added.

FIG. 15 schematically illustrates a first method for determining a location on shelf panel 200 where merchandise was removed or added. In step 271, all load cells 261, 262, 263, 264 are tared; that is, shelf panel 200 and all the merchandise placed thereon are treated as if they were a preload for load cells 261, 262, 263, 264 and set to zero. In step 272, a new weight value is measured by at least one load cell 261, 262, 263, 264 and received by evaluation unit 265. In step 273, evaluation unit 265 calculates center-of-mass coordinates based on the current weight data from load cells 261, 262, 263, 264. These center-of-mass coordinates do not reflect the center of mass of shelf panel 200, but rather the center of mass of the change in weight in the coordinate system of shelf panel 200. This is the location where merchandise was removed from or added to shelf panel 200. In step 274, this location and the change in weight are transmitted to control unit 241.

Figure 16:
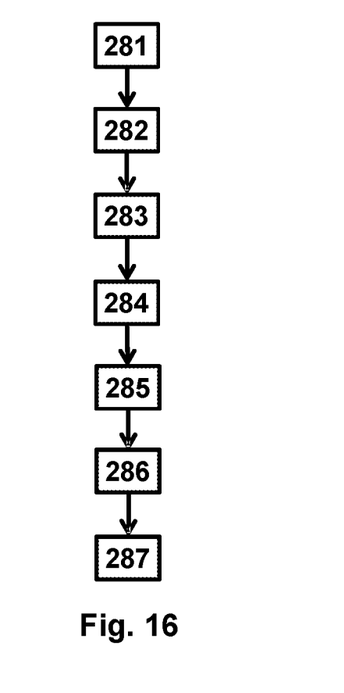
FIG. 16 illustrates a second method for determining a location on the shelf panel where a product was removed or added.

FIG. 16 schematically illustrates a second method for determining a location on shelf panel 200 where merchandise was removed or added. In step 281, center-of-mass coordinates are determined for the current center of mass of shelf panel 200 including all the merchandise placed thereon. This is the real center of mass. Shelf panel 200, or at least the merchandise placed thereon, is not tared. In step 282, a new weight value is measured by at least one load cell 261, 262, 263, 264 and received by evaluation unit 265. In step 283, evaluation unit 265 determines new center-of-mass coordinates based on the new data from load cells 261, 262, 263, 264. In step 284, a vector reflecting the shift in the center-of-mass coordinates is calculated from the previous center-of-mass coordinates and the new center-of-mass coordinates. Starting from the previous center of mass, the vector leads to the new center of mass, unless it is scaled. Then, in step 285, the vector is scaled using the total weight of the shelf panel and the change in total weight. In step 286, the location where a product was removed from or added to shelf panel 200 is determined by adding the scaled vector to the previous center-of-mass coordinates. In step 287, this location and the change in weight are transmitted to control unit 241.

Figure 17:
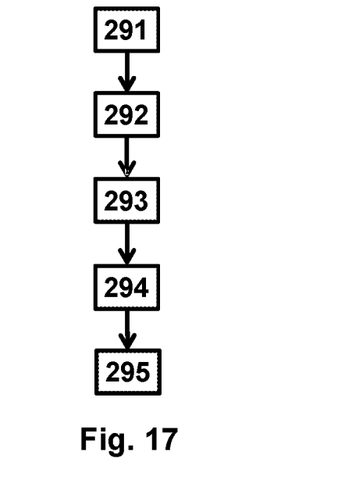
FIG. 17 illustrates a third method for determining a location on the shelf panel where a product was removed or added.

FIG. 17 schematically illustrates a third method for determining a location on shelf panel 200 where merchandise was removed or added. In step 291, each of the load cells 261, 262, 263, 264 determines a respective weight value, the previous weight value. In step 292, a new weight value is measured by at least one load cell 261, 262, 263, 264 and received by evaluation unit 265. In step 293, evaluation unit 265 calculates, for each load cell 261, 262, 263, 264 separately, the change in the weight value; i.e., the evaluation unit calculates the difference between the new weight value and the previous weight value. In step 294, evaluation unit 265 calculates the center-of-mass coordinates of the differential values of the four load cells 261, 262, 263, 264. These center-of-mass coordinates do not reflect the center of mass of shelf panel 200, but rather the center of mass of the change in weight in the coordinate system of shelf panel 200. This is the location where merchandise was removed from or added to shelf panel 200. In step 295, this location and the change in weight are transmitted to control unit 241.

The functions of various elements shown in the drawings, including the functional blocks, may be realized by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A shelving unit, the shelving unit comprising:
   at least two vertically disposed shelf uprights; and
   at least two shelf bracket assemblies,
   wherein each of the shelf bracket assemblies are capable of being mounted on a respective vertically disposed shelf upright of the shelf uprights, each of the shelf bracket assemblies comprising:
      at least one load cell;
      an anchor; and
      a cantilever configured to support a shelf panel,
   wherein for each respective shelf bracket assembly of the shelf bracket assemblies, in a condition where the respective shelf bracket assembly is mounted on the respective shelf upright, the cantilever projects from the respective shelf upright in a substantially horizontal direction,
   wherein the cantilever of each of the shelf bracket assemblies comprises a vertically disposed frame or a vertically disposed metal plate,
   wherein the cantilever of each of the shelf bracket assemblies comprises at least one mount for the at least one load cell,
   wherein the at least one load cell of each of the shelf bracket assemblies comprises a monolithic measuring body comprising:
      a force-supporting section;
      a force-introduction section; and
      a linkage section disposed between the force-supporting section and the force-introduction section,
      wherein the force-supporting section of the monolithic measuring body is laterally attached to the mount, and
      wherein the monolithic measuring body has at least one mounting hole through which the monolithic measuring body is attached to the mount with a screw extending horizontally through the monolithic measuring body,
   wherein the two shelf bracket assemblies are disposed at a same height, each on a respective one of the shelf uprights,
   wherein at least one shelf panel is placed on the two shelf bracket assemblies disposed at the same height, the shelf panel comprising two cross bars that are configured parallel to each other and supported at their ends on the force-introduction sections of two load cells, respectively, and
   wherein the shelving unit further comprises an evaluation unit which is configured to determine new center-of-mass coordinates from the data from the load cells, either at periodic intervals or upon a change in the total weight that is sensed by the four load cells on whose force-introduction sections the shelf panel rests, and which is configured to transmit these coordinates to a control unit, the control unit configured to determine a shelf region based on changes in the center-of-mass coordinates, the control unit configured to determine, from the change in total weight, the weight of the pieces of merchandise removed from or added to the determined shelf region, and configured to update the inventory stored in a memory for this shelf region.

2. The shelving unit as recited in claim 1, wherein, for each of the shelf bracket assemblies, the at least one load cell at least partially supports the shelf panel via the force-introduction section.

3. The shelving unit as recited in claim 2,
wherein each of the shelf bracket assemblies further comprises a plurality of load cells comprising the at least one load cell,
wherein each of the shelf bracket assemblies further comprises two mounts, comprising the mount, a respective load cell, of the load cells, being attached to each of the mounts via the respective force-supporting section, and
wherein the respective force-introduction section of the respective load cell supports a cross bar of the shelf panel.

4. The shelving unit as recited in claim 1, wherein for each of the shelf bracket assemblies:
the monolithic measuring body has a longitudinal axis between a force-supporting-side axial end and a force-introduction-side axial end,
the longitudinal axis of the at least one load cell attached to the mount is configured to extend in a horizontal direction,
the at least one load cell comprises at least one strain gauge configured to sense tensile or compressive deformation of the monolithic measuring body and disposed in a region of the linkage section on a top side or a bottom side of the monolithic measuring body, and
the at least one strain gauge is formed by a resistive track configured in parallel meanders and oriented horizontally and parallel to the longitudinal axis of the monolithic measuring body.

5. The shelving unit as recited in claim 1, wherein for each of the shelf bracket assemblies:
the linkage section comprises at least one narrowed portion at an upper linkage member, and at least one narrowed portion at a lower linkage member extending parallel to the upper linkage member.

6. The shelving unit as recited in claim 5, wherein for each of the shelf bracket assemblies:
the linkage section comprises two narrowed portions, comprising the narrowed portion of the upper linkage member,
the linkage section comprises two narrowed portions, comprising the narrowed portion of the lower linkage member,
the load cell comprises four strain gauges,
the load cell comprises, in a region of each of the two narrowed portions of the upper linkage member, a respective one of the four strain gauges disposed on a top side of the upper linkage member,
the load cell comprises, in a region of each of the two narrowed portions of the lower linkage member, a respective one of the four strain gauges disposed on a bottom side of the lower linkage member, and
the four strain gauges of the load cell are interconnected to form a Wheatstone bridge.

7. The shelving unit as recited in claim 5, wherein for each of the shelf bracket assemblies:
the linkage section comprises two narrowed portions, comprising the narrowed portion of the upper linkage member,
the linkage section comprises two narrowed portions, comprising the narrowed portion of the lower linkage member,
the load cell comprises four strain gauges,
the load cell comprises, in a region of each of the two narrowed portions of the upper linkage member, two strain gauges, of the four strain gauges, disposed on a top side of the upper linkage member, the respective two strain gauges being oriented in parallel and arranged adjacent to each other with respect to a narrow side of the monolithic measuring body, and
the four strain gauges of the load cell are interconnected to form a Wheatstone bridge.

8. The shelving unit as recited in claim 1, wherein for each of the shelf bracket assemblies, the force-introduction section has a receptacle configured as a recess originating at a top side of the monolithic measuring body and extending perpendicularly to the longitudinal axis.

9. The shelving unit as recited in claim 8, wherein for each of the shelf bracket assemblies:
the recess of the receptacle has a round contour at its side facing away from the top side of the monolithic measuring body,
the load cell comprises an insert that is in form-fitting engagement with the round contour of the receptacle,
the insert is formed, at its side opposite the form-fitting engagement with the round contour, with a rectangular contour for receiving the force-transmitting member,
the force-transmitting member is configured such that it can be form-fittingly received in the rectangular contour of the insert, and
the force-transmitting member has an edge for supporting a cross bar of the shelf panel.

10. The shelving unit as recited in claim 1, wherein for each of the shelf bracket assemblies, the monolithic measuring body is mirror-symmetric with respect to a horizontal plane.

11. The shelving unit as recited in claim 1, wherein for each of the shelf bracket assemblies:
the monolithic measuring body has:
a length along the longitudinal axis;
a height from a top side of the upper linkage member to a bottom side of the lower linkage member; and
a width in a dimension that is orthogonal to the length and the height,
the width of the monolithic measuring body is between 3 mm and 40 mm,
the length of the monolithic measuring body is 15 to 25 times the width and
the height of the monolithic measuring body is 5 to 10 times the width of the monolithic measuring body, and
the vertically disposed metal plate is flanged at its top and at its bottom, and the flanges cover the monolithic measuring body across the width or overhang the monolithic measuring body in the horizontal direction.

12. The shelving unit as recited in claim 1, wherein for each of the shelf bracket assemblies, the monolithic measuring body comprises at least three mounting holes, which are formed as bores and extend through the monolithic measuring body in a horizontal direction and through which the monolithic measuring body is screwed to the mount.

13. The shelving unit as recited in claim 1, wherein for each of the shelf bracket assemblies, the monolithic measuring body has a depression extending along the longitudinal axis from a linkage-section-proximate portion of the force-supporting section to the linkage section and adapted to at least partially receive a circuit board having electronics mounted thereon.

14. The shelving unit recited in claim 1,
wherein each of the shelf bracket assemblies further comprises two mounts, comprising the mount, on either side of the vertically disposed frame structure or on either side of the vertically disposed metal plate, each mounting device carrying a respective one of two load cells, comprising the load cell,
wherein the two load cells on either side supporting cross bars of the shelf panel.

15. The shelving unit as recited in claim 1,
wherein upon a change in total weight, the evaluation unit is configured to determine a vector between the previous center-of-mass coordinates and the new center-of-mass coordinates, and
wherein the shelf region determined by the control unit is configured to be calculated by the control unit from the vector and the total weight.

16. The shelving unit as recited in claim 1, wherein the evaluation unit is configured to tare all of the load cells periodically and simultaneously.

17. The shelving unit as recited in claim 1, wherein in order to determine the new center-of-mass coordinates, the evaluation unit is configured to calculate, for each of the load cells, a difference between a new weight value and a previous weight value and is configured to determine the new center-of-mass coordinates from the four differential values.

18. The shelving unit as recited in claim 6,
wherein the interconnection of two top strain gauges, of the four strain gauges, disposed on the top side and the two strain gauges disposed on the top side are provided on a strain gauge film, and
wherein the interconnection of two bottom strain gauges, of the four strain gauges, disposed on the bottom side and the two bottom strain gauges disposed on the bottom side are provided on another strain gauge film.

19. A shelf bracket assembly capable of being mounted on a vertically disposed shelf upright, the shelf bracket assembly comprising:
at least one load cell;
an anchor; and
a cantilever configured to support a shelf panel,
wherein, in a condition where the shelf bracket assembly is mounted on the shelf upright, the cantilever projects from the shelf upright in a substantially horizontal direction,
wherein the cantilever comprises a vertically disposed frame or a vertically disposed metal plate,
wherein the cantilever comprises at least one mount for the at least one load cell,
wherein the at least one load cell comprises a monolithic measuring body comprising:
a force-supporting section;
a force-introduction section; and
a linkage section disposed between the force-supporting section and the force-introduction section,
wherein the force-supporting section of the monolithic measuring body is laterally attached to the mount,
wherein the monolithic measuring body has at least one mounting hole through which the monolithic measuring body is attached to the mount with a screw extending horizontally through the monolithic measuring body,
wherein the recess of the receptacle has a round contour at its side facing away from the top side of the monolithic measuring body,
wherein the load cell comprises an insert that is in form-fitting engagement with the round contour of the receptacle,
wherein the insert is formed, at its side opposite the form-fitting engagement with the round contour, with a rectangular contour for receiving the force-transmitting member,
wherein the force-transmitting member is configured such that it can be form-fittingly received in the rectangular contour of the insert, and
wherein the force-transmitting member has an edge for supporting a cross bar of the shelf panel.

* * * * *